(12) United States Patent
Choi et al.

(10) Patent No.: US 10,744,864 B2
(45) Date of Patent: Aug. 18, 2020

(54) ENGINE MOUNT HAVING NOZZLE PLATE EMBEDDED WITH DUAL MEMBRANE

(71) Applicants: Hyundai Motor Company, Seoul (KR); Kia Motors Corporation, Seoul (KR)

(72) Inventors: Jeong-Hun Choi, Gyeonggi-do (KR); Ki-Seok Han, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 22 days.

(21) Appl. No.: 16/142,962

(22) Filed: Sep. 26, 2018

(65) Prior Publication Data
US 2019/0248220 A1    Aug. 15, 2019

(30) Foreign Application Priority Data
Feb. 13, 2018  (KR) .......................... 10-2018-0018077

(51) Int. Cl.
*B60K 5/12* (2006.01)
*F16F 13/10* (2006.01)

(52) U.S. Cl.
CPC .......... *B60K 5/1208* (2013.01); *B60K 5/1225* (2013.01); *B60K 5/1283* (2013.01); *F16F 13/10* (2013.01); *F16F 13/105* (2013.01)

(58) Field of Classification Search
CPC .......... F16F 13/08; F16F 13/10; F16F 13/102; F16F 13/105; F16F 13/106; B60K 5/12; B60K 5/1208; B60K 5/1225; B60K 5/1283

USPC .......................... 267/140.13, 140.14, 140.15
See application file for complete search history.

(56) References Cited

U.S. PATENT DOCUMENTS

| | | | | |
|---|---|---|---|---|
| 4,709,907 A | * | 12/1987 | Thorn .................. | F16F 13/106 267/140.13 |
| 4,925,162 A | * | 5/1990 | Kojima ................. | F16F 13/106 267/122 |
| 5,167,403 A | * | 12/1992 | Muramatsu ............ | F16F 13/26 267/140.13 |
| 5,180,148 A | * | 1/1993 | Muramatsu ............ | F16F 13/26 248/562 |
| 5,246,212 A | * | 9/1993 | Funahashi ............... | F16F 13/26 180/312 |
| 5,492,311 A | | 2/1996 | Kurr et al. | |

(Continued)

FOREIGN PATENT DOCUMENTS

| | | |
|---|---|---|
| JP | 3-125045 A | 5/1991 |
| JP | 2-50335 B2 | 11/1999 |

(Continued)

*Primary Examiner* — Thomas J Williams
(74) *Attorney, Agent, or Firm* — Mintz Levin Cohn Ferris Glovsky and Popeo, P.C.; Peter F. Corless

(57) ABSTRACT

An engine mount for a vehicle is provided which attenuates vibration generated when an engine of the vehicle operates. The engine mount includes a main rubber body which supports a core and an inner casing which fixes the main rubber body to a housing. A nozzle plate is mounted in the inner casing and an upper membrane and a lower membrane are attached thereto. The nozzle plate includes a lower plate and an upper plate that is inserted and coupled into the lower plate. The upper membrane is attached to a top plate of the upper plate and the lower membrane is attached to a bottom plate of the lower plate.

5 Claims, 8 Drawing Sheets

(56) References Cited

U.S. PATENT DOCUMENTS

| | | | |
|---|---|---|---|
| 7,063,191 B2 * | 6/2006 | Hopkins | F16F 13/10 188/267.2 |
| 2002/0043748 A1 * | 4/2002 | Meyer | F16F 13/106 267/140.11 |
| 2010/0213650 A1 * | 8/2010 | Katayama | F16F 13/106 267/118 |
| 2011/0193276 A1 | 8/2011 | Ogasawara et al. | |

FOREIGN PATENT DOCUMENTS

| | | |
|---|---|---|
| KR | 2013-0056786 A | 5/2013 |
| KR | 2014-0114602 A | 9/2014 |
| KR | 2017-0026946 A | 3/2017 |

* cited by examiner

L1 = L2

L1 > L2

L1 < L2

ENGINE MOUNT HAVING NOZZLE PLATE EMBEDDED WITH DUAL MEMBRANE

CROSS-REFERENCE TO RELATED APPLICATIONS

This application claims priority under 35 U.S.C. § 119 to Korean Patent Application No. 10-2018-0018077, filed on Feb. 13, 2018, the disclosure of which is incorporated herein by reference in its entirety.

BACKGROUND

1. Field of the Invention

The present invention relates to an engine mount for a vehicle, and more particularly, to an engine mount for a vehicle which attenuates vibration generated when an engine of the vehicle operates.

2. Description of the Related Art

In general, an engine mount for a vehicle is a device that attenuates vibration generated when an engine operates. The vibration of the engine is broadly classified into low-frequency vibration and high-frequency vibration, and examples of the low-frequency vibration include fluctuation in torque occurring when the engine is turned on/off or the engine operates at a low speed, vibration of a power plant occurring due to inertial force and a force couple caused by rotational motion of a crank shaft when the engine operates at a low speed, vibration of a vehicle body occurring due to unbalanced force when tires rotate, and vibration of the vehicle body occurring through a suspension system due to a profile of a road surface.

Examples of the high-frequency vibration include vibration of the power plant occurring due to inertial force and a force couple caused by rotational motion of the crank shaft when the engine operates at a high speed, vibration occurring when gears in a transmission engage, vibration of a cylinder block when fuel is combusted, bending vibration and torsional vibration of the crank shaft, and bending vibration and torsional vibration of the power plant.

Therefore, the low-frequency vibration with high amplitude or the high-frequency vibration with low amplitude, which occurs when the engine operates, is transmitted to the engine mount, and a fluid encapsulated in the engine mount repeatedly flows upward or downward in the internal space of the engine mount as a main rubber body installed in the engine mount is compressed and restored, to thus attenuate vibrational energy of the engine.

FIG. 1 illustrates an engine mount according to the related art. Referring to FIG. 1, the engine mount in the related art includes housings 10 and 10' which define an external appearance body, a core 30 which is mounted at an upper side of the housings 10 and 10' and to which a fastening bolt 31 is fixed, a main rubber body 20 which supports the core 30, an inner casing 40 which fixes the main rubber body 20 to the housing 10, a plate 50 which is mounted in the inner casing 40 and to which a membrane 60 is attached, the membrane 60 which divides a lower portion below the core 30 and the main rubber body 20 into an upper liquid chamber 11 and a lower liquid chamber 12 in which a liquid is encapsulated, and a diaphragm 70 which is made of an elastic material and coupled to a lower portion of the membrane to shield a lower side of the housing 10 of the engine mount.

In particular, the plate 50 includes an upper plate 51 and a lower plate 52 which are coupled to each other, and the membrane 60 includes a rubber member 61 and a rubber plate 62 inserted and fixed into the rubber member 61. When vibration is transmitted from the engine to the engine mount in the related art which is configured as described above, the volume of the upper liquid chamber 11 changes as the core 30 and the main rubber body 20 are deformed in shape, and an amount of fluid that corresponds to the changed volume is delivered from the upper liquid chamber 11 to the lower liquid chamber 12 through an orifice 53 in the plate 50 or a gap between the membrane 60 and the plate 50, thereby attenuating vibration applied to the engine mount.

When the vibration applied to the engine mount is low-frequency vibration with high amplitude, the amount of fluid that corresponds to the deformation in volume of the core 30 and the main rubber body 20 is greater than the movement amount of fluid that may pass through the gap between the membrane 60 and the plate 50. As a result, the fluid is unable to pass through the gap between the membrane 60 and the plate 50, and instead flows from the upper liquid chamber 11 to the lower liquid chamber 12 along the annular orifice 53 formed in the plate 50, which causes high damping force.

In contrast, when the vibration applied to the engine mount is high-frequency vibration with low amplitude, the amount of fluid that corresponds to the deformation in volume of the core 30 and the main rubber body 20 is less than the movement amount of fluid that may pass through the gap between the membrane 60 and the plate 50. As a result, the fluid flows, in a short period of time, from the upper liquid chamber 11 to the lower liquid chamber 12 while passing through the gap between the membrane 60 and the plate 50, which causes low damping force.

In addition, an enlarged view of the membrane 60 illustrated at the lower side of FIG. 1 shows a flow path 54 through which the fluid flows through the gap between the membrane 60 and the plate 50. In other words, the membrane 60 is coupled between a catching projection 51a of the upper plate 51 and a catching projection 52a of the lower plate 52, a first clearance d1 is formed between an upper surface of the rubber member 61 of the membrane 60 and the catching projection 51a of the upper plate 51, and a second clearance d2 is formed between a bottom surface of the rubber member 61 of the membrane 60 and the catching projection 52a of the lower plate 52, to form the membrane flow path 54 through which the fluid flows.

However, as illustrated in FIG. 2, in the case of the low-frequency vibration with high amplitude, rattling noise, which is a type of impact sound, occurs from the membrane 60 due to the vibration applied to the membrane 60, and the rattling noise occurs due to the presence of the first clearance d1 and the second clearance d2 that define the flow path 54 in the membrane 60. Therefore, noise such as the rattling noise occurring from the membrane 60 of the engine mount in the related art acts as a factor that degrades noise, vibration and harshness (NVH) performances of the vehicle.

SUMMARY

The present invention provides a configuration of an engine mount having a membrane capable of reducing noise and improving NVH performances of a vehicle by removing a clearance between the membrane and a plate and reducing rattling noise occurring in the engine mount.

An exemplary embodiment of the present invention provides an engine mount having a membrane for improving dynamic characteristics and reducing noise, the engine mount may include: a main rubber body which supports a core; an inner casing which fixes the main rubber body to a housing; and a nozzle plate which is mounted in the inner casing and to which an upper membrane and a lower membrane are attached, in which the nozzle plate includes a lower plate and an upper plate inserted and coupled into the lower plate, the upper membrane is attached to a top plate of the upper plate, and a lower membrane is attached to a bottom plate of the lower plate.

The engine mount having the membrane for improving dynamic characteristics and reducing noise according to the present invention, which is configured as described above, has the following effects.

First, according to the engine mount of the present invention, since no gap is formed between the plate and the membrane, rattling noise, which may occur when low-frequency vibration with high amplitude is applied, is removed, to thus improve the NVH performances of the vehicle.

Second, since the engine mount of the present invention has the bilayer structure including the upper membrane and the lower membrane, durability of the membranes may be increased.

Third, according to the engine mount of the present invention, the dynamic characteristics of the engine mount may be tuned by adjusting thicknesses of the upper and lower membranes or lengths of inner diameter portions of the membranes, and as a result, the present invention is a progressive invention capable of improving a degree of design freedom to improve the NVH performances of the vehicle.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, a configuration and an operation of an engine mount having a membrane for improving dynamic characteristics and reducing noise according to the present invention will be described in detail with reference to the drawings. However, the disclosed drawings are provided as an example for fully transferring the spirit of the present invention to those skilled in the art. Therefore, the present invention is not limited to the drawings disclosed below, and may be specified as other exemplary embodiments.

Unless otherwise defined, the terminologies used in the specification of the present invention have the meanings that a person with ordinary skill in the technical field to which the present invention pertains typically understands, and in the following description and the accompanying drawings, a detailed description of publicly known functions and configurations will be omitted so as to avoid unnecessarily obscuring the subject matter of the present invention.

Figure 1:
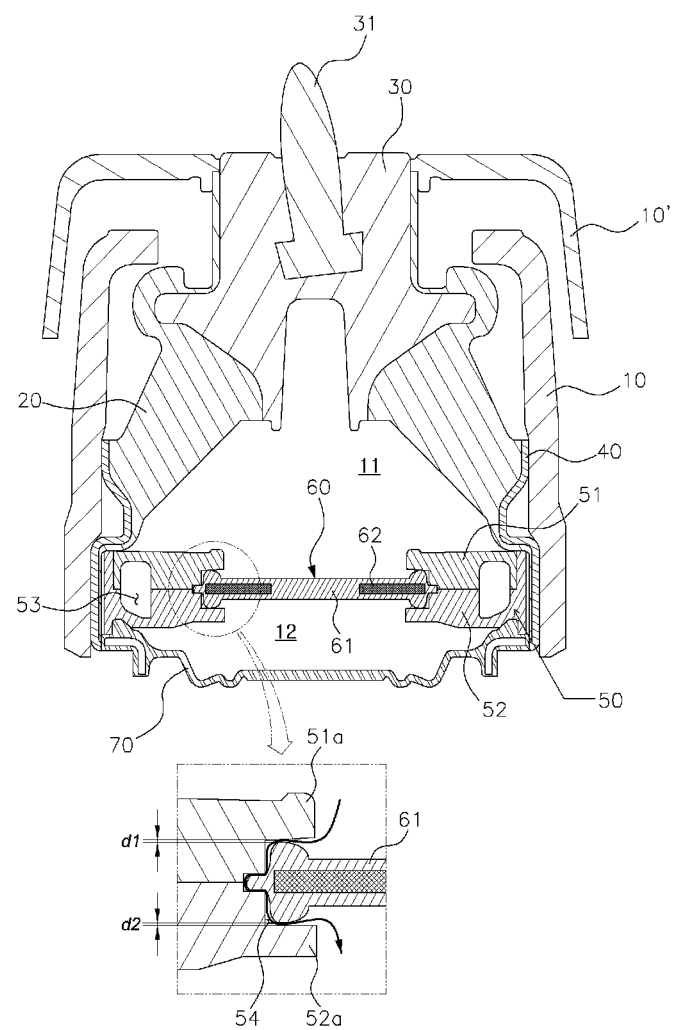
FIG. 1 is a configuration view of an engine mount according to the related art.
Figure 2:
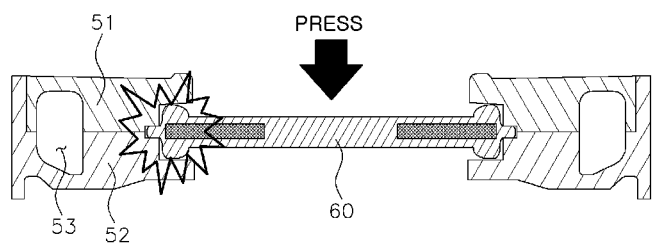
FIG. 2 is a view illustrating a state in which rattling noise occurs in the engine mount according to the related art.
Figure 3:
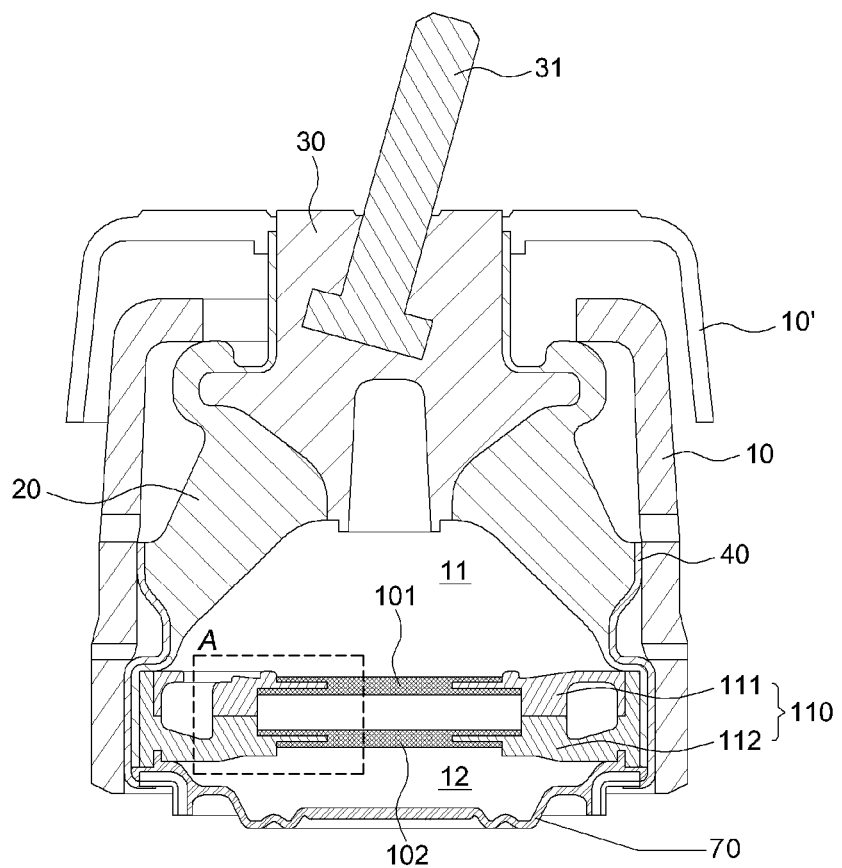
FIG. 3 is a configuration view of an engine mount according to an exemplary embodiment of the present invention.
Figure 4:
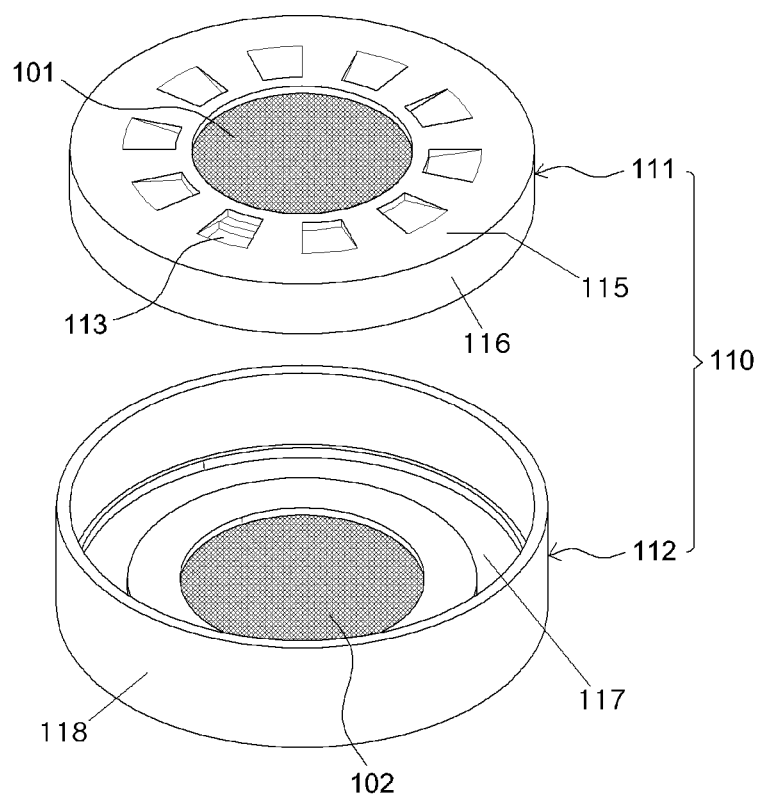
FIG. 4 is a detailed perspective view of a nozzle plate of the engine mount according to an exemplary embodiment of the present invention.
Figure 5:
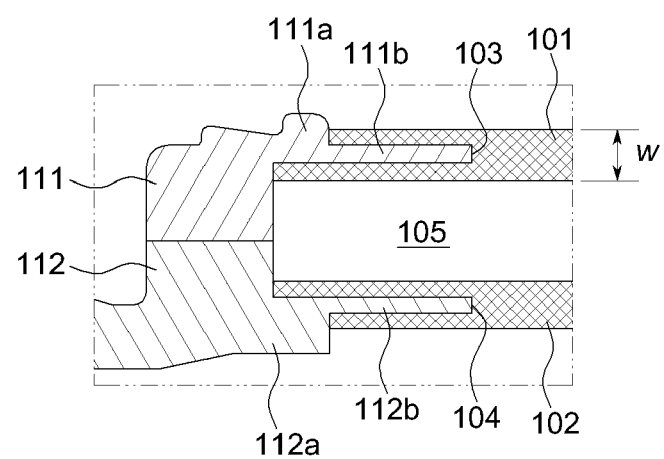
FIG. 5 is an enlarged cross-sectional view of part A in FIG. 3, that is, a detailed view of the nozzle plate of the engine mount according to an exemplary embodiment of the present invention.

FIG. 3 is a configuration view of an engine mount of the present invention, FIG. 4 is a detailed perspective view of a nozzle plate of the engine mount of the present invention, and FIG. 5 is an enlarged cross-sectional view of part A in FIG. 3, that is, a detailed view of the nozzle plate of the engine mount of the present invention. Constituent elements of the engine mount identical to the constituent elements of the engine mount in the related art will be described by using the same reference numerals.

Referring to FIG. 3, the engine mount of the present invention may include housings 10 and 10' which define an external appearance body, a core 30 mounted at an upper side of the housings 10 and 10' and to which a fastening bolt 31 is fixed, a main rubber body 20 which supports the core 30, an inner casing 40 which fixes the main rubber body 20 to the housing 10, a nozzle plate 110 mounted in the inner casing 40 and to which an upper membrane 101 and a lower membrane 102 are attached, and a diaphragm 70 made of an elastic material and coupled to the inner casing 40 at a lower side of the nozzle plate 110 to shield a lower side of the housing 10 of the engine mount.

As illustrated in FIG. 4, the nozzle plate 110 may include a lower plate 112 and an upper plate 111 inserted and coupled into the lower plate 112. The upper plate 111 may have a circular top plate 115 and a sidewall 116 which extends downward along a circumference of the top plate 115, the top plate 115 may have an opening formed at a center thereof, and the upper membrane 101 may be attached into the opening. The upper membrane 101 may be made of a rubber material.

Orifices 113 through which a fluid flows may be formed at one side of the top plate 115 of the upper plate 111. The lower plate 112 may have a circular bottom plate 117 and a sidewall 118 which extends upward along a circumference of the bottom plate 117, the bottom plate 117 may have an opening at a center thereof, and the lower membrane 102 may be attached into the opening. The lower membrane 102 may be made of a rubber material. In particular, as illustrated in an enlarged cross-sectional view of the nozzle plate 110 in FIG. 5, a catching projection 111*a* may be formed inside the sidewall 116 of the upper plate 111, and an insertion piece 111*b*, which extends inward from the catching projection 111*a*, may be formed in parallel with the catching projection 111*a*.

Additionally, an insertion groove 103 into which the insertion piece 111b is inserted may be formed in a body of the upper membrane 101 to couple the upper membrane 101 and the upper plate 111 to each other. A catching projection 112a may be formed inside the sidewall 118 of the lower plate 112, and an insertion piece 112b, which extends inward from the catching projection 112a, may be formed in parallel with the catching projection 112a. An insertion groove 104 into which the insertion piece 112b is inserted may be formed in a body of the lower membrane 102 to couple the lower membrane 102 and the lower plate 112 to each other.

Meanwhile, the upper membrane 101 and the lower membrane 102 may have predetermined thicknesses w, and the dynamic characteristics thereof may be changed by adjusting the thicknesses. A hollow space portion 105 may be formed between the upper membrane 101 and the lower membrane 102.

Figure 6:
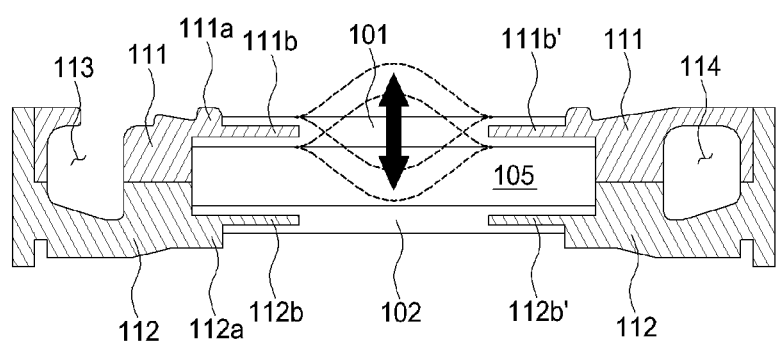
FIGS. 6 to 8 are views illustrating states in which the nozzle plate of the engine mount according to an exemplary embodiment of the present invention operates.

An operation of the engine mount of the present invention, which is configured as described above, will be described with reference to FIGS. 6 to 8. First, as illustrated in FIG. 6, when small vibration is applied to the engine mount of the present invention due to high-frequency vibration in a state such as an idle state of the engine, only the upper membrane 101 is moved vertically (e.g., upward and downward) to attenuate the vibration.

Figure 7:
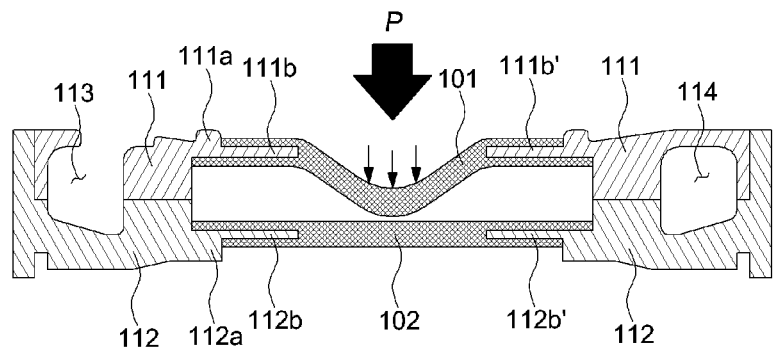

As illustrated in FIG. 7, when large amplitude vibration is applied to the engine mount due to a substantial displacement of the vehicle in a state such as when the vehicle is being driven on a rough or uneven road, the upper membrane 101 may be deformed downward to attenuate the vibration caused by the displacement of the vehicle. In particular, when the upper membrane 101 is maximally deformed downward, the large amplitude vibration may be attenuated by the lower membrane 102 as the upper membrane 101 comes into contact with the lower membrane 102 and thus, the lower membrane 102 may operate as a type of stopper.

Figure 8:
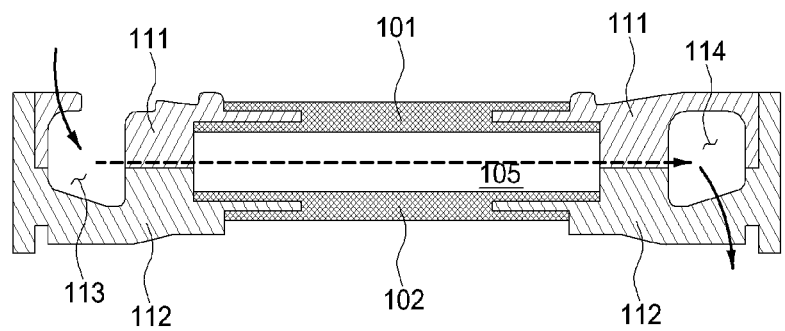

As illustrated in FIG. 8, when the vibration applied to the engine mount of the present invention is the large amplitude vibration, the upper membrane 101 may be deformed downward, and the fluid may flow from an upper liquid chamber 11 to a lower liquid chamber 12 along the orifices 113 formed in the upper plate 111 to attenuate the large amplitude vibration by the engine mount. Therefore, in the engine mount of the present invention, the upper membrane 101 and the lower membrane 102 may attenuate the large amplitude vibration occurring due to the small vibration and the substantial displacement caused by the high-frequency vibration. As a result, unlike the related art, no clearance is required between the nozzle plate and the membrane, and thus, NVH performances of the vehicle may be improved since rattling noise, which occurs due to the presence of the clearance in the engine mount in the related art, may be eliminated.

The engine mount of the present invention, which operates as described above, may have the dual membrane structure including the upper membrane 101 and the lower membrane 102 in the nozzle plate 110, and as a result, durability of the membrane may be improved compared to the single membrane structure in the related art.

Figure 9A:
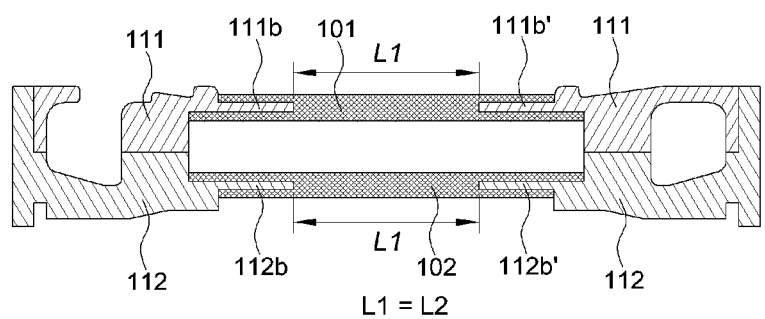
FIGS. 9A-9C are views illustrating states in which the engine mount according to an exemplary embodiment of the present invention is tuned.
Figure 9B:
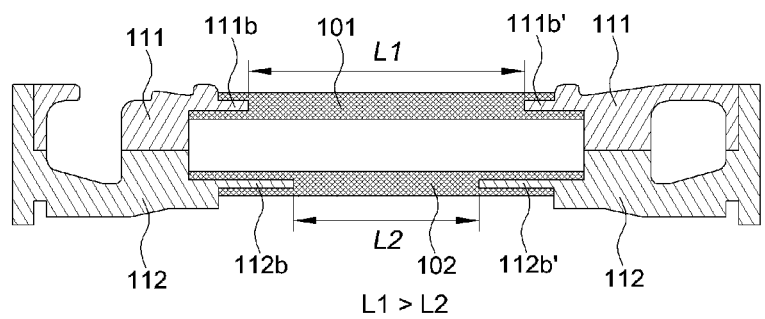
Figure 9C:
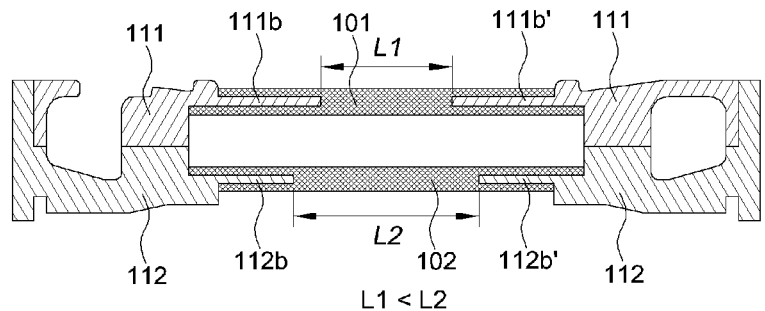

FIGS. 9A-9C are views illustrating states in which the engine mount of the present invention is tuned. In the case of the engine mount of the present invention, it may be possible to tune the effect of attenuating the high-frequency vibration with low amplitude by adjusting a length of the insertion piece 111b of the upper plate 111 and a length of the insertion piece 112b of the lower plate 112.

As illustrated in FIGS. 9A-9C, assuming that a length between an end of the insertion piece 111b at a first side of the upper plate 111 for coupling the upper membrane 101 and an end of the insertion piece 111b at a second side of the upper plate 111 is an upper length L1 and a length between an end of the insertion piece 112b at a first side of the lower plate 112 for coupling the lower membrane 102 and an end of the insertion piece 111b at a second side of the lower plate 112 is a lower length L1, it may be possible to tune the effect of attenuating the high-frequency vibration in the idle state by adjusting the upper length L1 and the lower length L2.

In other words, assuming that the dynamic characteristics against the high-frequency vibration in the idle state when the rubber upper length L1 and the rubber lower length L2 are equal to each other (L1=L2) is an intermediate value as illustrated in FIG. 9A (at the upper side), the upper membrane 101 may be moved to a larger degree than the lower membrane 102 in a case in which the upper length L1 is greater than the lower length L2 (L1>L2) as illustrated in FIG. 9B (at the intermediate side). As a result, the dynamic characteristics against the high-frequency vibration in the idle state may be further decreased in comparison with the case in which the upper length L1 and the lower length L2 are equal to each other, based on Equation F=Kx (Hook' law, F: elastic force, K: spring constant, x: deformation distance). Therefore, the effect of the engine mount that attenuates vibration may be increased as the dynamic characteristics are decreased.

When the upper length L1 is less than the lower length L2 (L1<L2) as illustrated in FIG. 9C (at the lower side), the dynamic characteristics against the high-frequency vibration in the idle state may be increased in comparison with the case in which the rubber upper length L1 and the rubber lower length L2 are equal to each other, based on F=Kx, since the upper membrane 101 may be moved to a smaller degree than the lower membrane 102 against the high-frequency vibration in the idle state in the case in which the upper length L1 is less than the lower length L2 (L1<L2). In particular, as the thickness w of the upper membrane 101 is increased, the movement amount of the upper membrane 101 may be decreased, such that the dynamic characteristics are increased. Meanwhile, when a fluid is accommodated in the hollow space portion 105 between the upper membrane 101 and the lower membrane 102 or air is damped, the fluid or the air creates resistive force against the vibration, and the movement amount of the upper membrane 101 is decreased, such that the dynamic characteristics may be increased.

What is claimed is:

1. An engine mount for a vehicle, comprising:
    a main rubber body which supports a core of the engine mount;
    an inner casing which fixes the main rubber body to a housing of the engine mount;
    a nozzle plate which is mounted in the inner casing and to which an upper membrane and a lower membrane are attached and includes a lower plate and an upper plate inserted and coupled into the lower plate,
    an upper catching projection formed inside a sidewall of the upper plate;
    an upper insertion piece extending from the upper catching projection, wherein the upper insertion piece is inserted into an upper insertion groove formed in a body of the upper membrane;
    a lower catching projection formed inside a sidewall of the lower plate; and a lower insertion piece extending from the lower catching projection, wherein the lower insertion piece is inserted into a lower insertion groove formed in a body of the lower membrane, wherein the upper membrane is attached to a top plate of the upper plate, and the lower membrane is attached to a bottom plate of the lower plate, and wherein dynamic characteristics of the engine mount are adjusted by adjusting an upper length between an end of the upper insertion piece at a first side of the upper plate and an end of the upper insertion piece at a second side of the upper plate and a lower length between an end of the lower insertion piece at a first side of the lower plate and an end of the lower insertion piece at a second side of the lower plate.

2. The engine mount of claim 1, wherein dynamic characteristics of the engine mount are adjusted by adjusting thicknesses of the upper membrane and the lower membrane.

3. The engine mount of claim 1, wherein a hollow space portion is formed between the upper membrane and the lower membrane, and dynamic characteristics of the engine mount are adjusted by accommodating a fluid or air in the space portion.

4. The engine mount of claim 1, wherein an orifice through which a fluid flows is formed at one side of the top plate of the upper plate.

5. A vehicle having the engine mount of claim 1.

* * * * *